(12) United States Patent
Hinderer et al.

(10) Patent No.: US 11,951,492 B2
(45) Date of Patent: Apr. 9, 2024

(54) MONITORING OF A FLUIDIC FREE JET

(71) Applicant: STRATEC SE, Birkenfeld (DE)

(72) Inventors: Fabian Hinderer, Neulingen (DE); Igor Polushkin, Pforzheim (DE)

(73) Assignee: STRATEC SE, Birkenfeld (DE)

( * ) Notice: Subject to any disclaimer, the term of this patent is extended or adjusted under 35 U.S.C. 154(b) by 691 days.

(21) Appl. No.: 16/799,110

(22) Filed: Feb. 24, 2020

(65) Prior Publication Data

US 2020/0269259 A1    Aug. 27, 2020

(30) Foreign Application Priority Data

Feb. 25, 2019   (EP) ...................................... 19158985
May 28, 2019   (LU) ........................................ 101254

(51) Int. Cl.
*B05B 1/08*  (2006.01)
*B05B 1/30*  (2006.01)
*G01F 1/32*  (2022.01)

(52) U.S. Cl.
CPC ................... *B05B 1/08* (2013.01); *B05B 1/30* (2013.01); *G01F 1/3227* (2013.01)

(58) Field of Classification Search
CPC .......... B05B 1/08; B05B 1/30; B05B 12/085; B05B 12/082; G01F 1/3227; G01F 1/3259; F15C 1/22

USPC .......................................... 73/861.19, 861.95
See application file for complete search history.

(56) References Cited

U.S. PATENT DOCUMENTS 3,640,133 A     2/1972  Adams
4,122,845 A *  10/1978  Stouffer ................. B05B 11/00
                                                          401/15
4,550,614 A *  11/1985  Herzl .................... G01F 1/3227
                                                          73/861.19

FOREIGN PATENT DOCUMENTS

GB       1515892 A        6/1978
JP       H07318387 A     12/1995
WO       7900361 A1       6/1979

* cited by examiner

*Primary Examiner* — Qingzhang Zhou
(74) *Attorney, Agent, or Firm* — 24IP Law Group USA, PLLC; Timothy R DeWitt

(57) ABSTRACT

A system and method for monitoring a dispensed fluid jet with an oscillation nozzle, comprising a main channel and at least one secondary channel surrounding the main channel, wherein the nozzle has an inlet and an outlet for an air flow defining a flow axis running centrally through the main channel, characterized in that the secondary channel comprises a drill hole.

8 Claims, 3 Drawing Sheets

MONITORING OF A FLUIDIC FREE JET

CROSS-REFERENCE TO RELATED APPLICATIONS

The present application claims priority to European Patent Application No. EP 19 158 985.2 filed on Feb. 25, 2019, and Luxembourg Patent Application No. LU 101254 filed on May 28, 2019. The aforementioned applications are hereby incorporated by reference in their entirety.

BACKGROUND OF THE INVENTION

Field of the Invention

The invention relates to a method for monitoring a dispensed fluid jet.

Brief Description of the Related Art

Automated analyser systems for use in clinical diagnostics and life sciences are produced by a number of companies. For example, STRATEC® SE, Birkenfeld, Germany, produces a number of devices for specimen handling and detection for use in automated analyser systems and other laboratory instrumentation.

The detection of a fluidic free jet is well known in the prior art and can be done by various technologies. Optical sensors are used for instance which are based on the principle of a photoelectric barrier or image processing. Capacitance sensors are also used for detecting a change in the capacitance by the free jet. Finally, inductive sensors and tactile sensors may be used for detecting a free fluidic jet.

There are various options known in the prior art for monitoring the flow in a tube, which determine, for example, the volume flow of a fluid by means of thermal measurements or ultrasonic waves.

Pneumatic sensors are usually used to detect solid objects. They may also be used to detect fluids under certain circumstances. Generally, there are four types of pneumatic sensors: stagnation pressure sensors, ring jet sensors, counter barrier jet sensors and barrier jet sensors. Pneumatic sensors may also be used for distance measurement, tool breakage control and position control. The main advantage of these sensors is that they work contactless and have a relatively small size and that they are dirt-resistant.

Stagnation pressure sensors (FIG. 1A) use a constant pressure $p_1$. If an object reaches the front of a nozzle, a stagnation pressure $p_2$ builds up, which is proportional to the distance of the object. The stagnation pressure $p_2$ can be tapped and measured via a lateral channel.

Using ring barrier sensors (FIG. 1B), a constant free jet $p_1$ is applied via ring shaped channels. If an object reaches the front of a nozzle, the free jet is reflected from the object into the center of the nozzle. This creates a stagnation pressure $p_2$ in the middle channel.

Using counter barrier sensors (FIG. 1C), two different jets are applied in the measurement chamber with pressure $p_1$. The jet created on the underside is stronger than the one at the top due to different channel geometries. Thus, a stagnation pressure $p_2$ builds up in front of the upper nozzle, which can be measured in a separate channel. If an object gets into the free jet of the lower nozzle and interrupts it, the stagnation pressure is also built up.

A barrier sensor (FIG. 1D) consists of a transmitter and receiver that lie opposite to each other. A constant pressure $p_1$ is applied to create a free jet. If an object arrives between sender and receiver, the stagnation pressure $p_2$ is built up.

Optical sensors have the aim to detect a fluidic free jet within a low volume flow. The fluidic free jet can be easily disturbed in low volumetric flows and therefore tends to break off into smaller droplets. These droplets may settle on surrounding surfaces. Thus, sensor solutions which can easily be influenced by contaminations with droplets, debris or a deposition of substances contained in the fluid (e.g. salt) are unsuitable, for example for optical sensors. The contamination will result in a false signal, which results in an erroneous detection of the fluidic free jet.

Sensors for flow measurement in tubes are used in methods for detecting a volume flow in a tube/pipeline and cannot be used for a free jet, since completely different boundary conditions are present.

All pneumatic sensors have in common that the air flow is interrupted by a solid body in order to generate a back pressure or to interrupt the air flow. In case of a fluid jet, the air flow also interacts directly with the fluid, but can cause high disturbances in the trajectory of the jet, because of a correspondingly high force that is acting on a fluid jet. If the air volume flip is reduced to avoid deflection of the fluid jet the measured signal will change and therefore the signal noise ratio will be reduced which results in a reduced system robustness, as for example slammed doors may easily influence the pressure measurement.

Oscillation nozzles are used exclusively in the already described or related applications. A use as a sensor for monitoring fluids in form of a free jet is the subject of this invention.

SUMMARY OF THE INVENTION

It is an object of the present invention to provide a device and a method for monitoring a dispensed fluid jet.

The present disclosure provides an oscillation nozzle, comprising a main channel and at least one secondary channel surrounding the main channel, wherein the nozzle has an inlet and an outlet for an air flow defining a flow axis running centrally through the main channel, characterized in that the secondary channel comprises a drill hole.

In a further aspect, the outlet of the nozzle comprises a sensor for measuring the oscillation of the air flow. It is envisaged that the sensor can be a pressure sensor.

In a further embodiment, the nozzle may further comprise a second secondary channel which surrounds the main channel opposite of a first secondary channel.

A further object of the present invention is a system comprising an oscillation nozzle, comprising a main channel and at least one secondary channel surrounding the main channel, wherein the nozzle has an inlet and an outlet for a fluid defining a flow axis running centrally through the main channel, characterized in that the secondary channel comprises a drill hole; and a pressure sensor for sensing the oscillation frequency.

In a further aspect of the system the pressure sensor can be arranged within the outlet of the nozzle hole.

In a further embodiment of a system according to the invention, a control member may be present that is connected to the pressure sensor for monitoring the oscillation frequency to a predefined intended frequency.

The outlet of a nozzle of a system according to the invention may comprise a sensor for measuring the pressure of a fluid jet.

The system's sensor may be a pressure sensor.

In a further aspect of the system, the nozzle may comprise a second secondary channel which surrounds the main channel opposite of a first secondary channel.

Another object of the invention is a method for monitoring a dispensed fluid jet, comprising the steps of
   a. Providing an oscillating flow by injecting a constant air flow in oscillation nozzle, comprising a main channel and at least one secondary channel surrounding the main channel, wherein the nozzle has an inlet and an outlet for an air flow defining a flow axis running centrally through the main channel, wherein the secondary channel comprises a drill hole;
   b. Determining the oscillation frequency of the flow;
   c. Injecting a fluid jet and in parallel monitoring frequency, amplitude and phase of the air flow;
   d. Determining the time of the fluid jet for passing the oscillation nozzle;
   e. Calculating the fluid volume from the determined passing time and known fluid flow rates.

In a method of the invention, the dispensed fluid may have a volume of maximum 50 µl.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

FIG. 1A shows a stagnation pressure sensor, FIG. 1B shows a ring barrier sensor, FIG. 1C shoes a counter barrier sensor, FIG. 1D shows a barrier sensor.

DETAILED DESCRIPTION OF THE INVENTION

The technical problem is solved by the independent claims. The dependent claims cover further specific embodiments of the invention.

The present invention is based on an oscillation nozzle, which is available in the market in different embodiments. The oscillation nozzle is supplied with a fluid flow which is set in oscillation by the geometry of the nozzle itself. This results in an oscillation jet at the outlet of the nozzle.

Figure 1D:
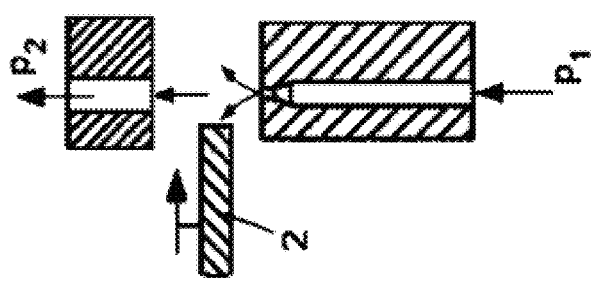
FIGS. 1A-1D show pneumatic sensors of the state of the art.
Figure 1C:
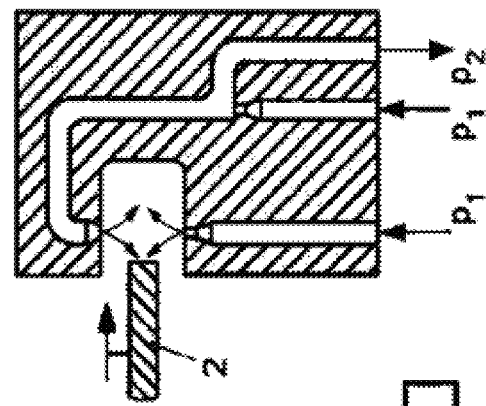
Figure 1B:
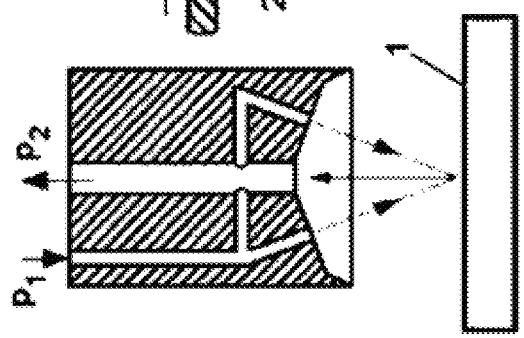
Figure 1A:
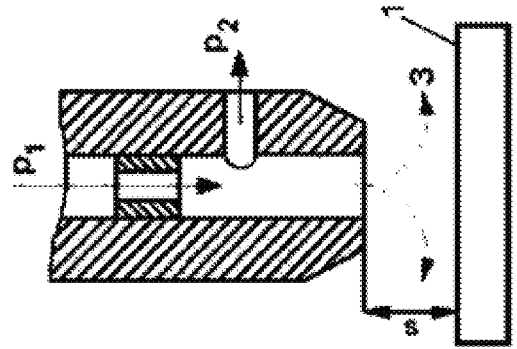
Figure 2A:
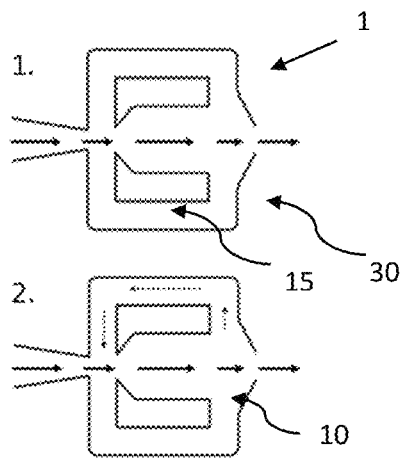
FIGS. 2A-2F illustrate an oscillation nozzle.
Figure 2B:
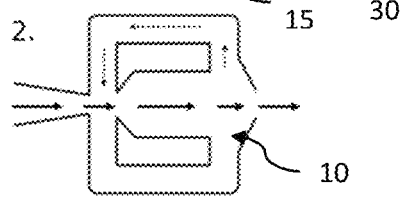
Figure 2C:
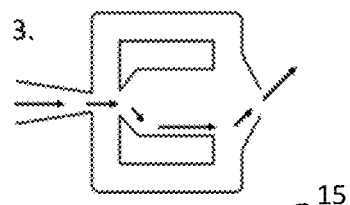
Figure 2D:
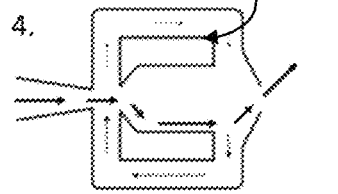
Figure 2E:
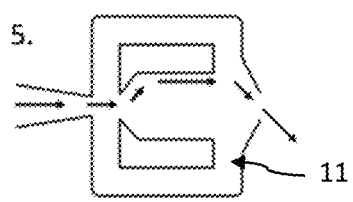
Figure 2F:
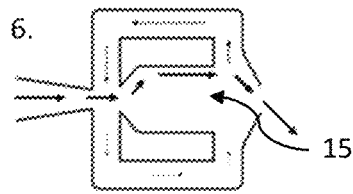
Figure 3:
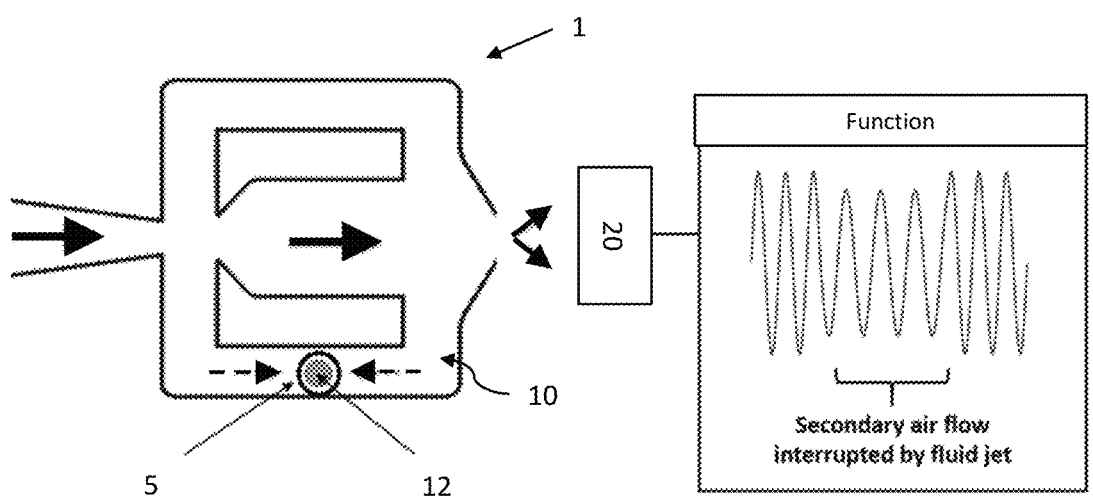
FIG. 3 shows an oscillation nozzle with a drill hole in a secondary channel.

FIG. 2A-F shows an oscillation nozzle 1. The air flow starts with a main air flow (bold arrows) passing through the middle of the main channel 15 and leaving the outlet 30 of the nozzle without oscillation (FIG. 2A). Because of asymmetries and turbulences, the air flow splits into main air flow and a first secondary side flow (dotted arrows). Said first secondary air flow goes through the upper secondary channel 10 (FIG. 2B) and deflects the main air flow so that it adheres to one side of the main channel 15 (FIG. 2C), due to the so called Coanda-effect. The deflected main air flow leaves the oscillation nozzle with an angle and splits in the main channel again so that a second secondary air flow goes through the lower secondary channel 11 at the opposite side (FIG. 2D). In parallel the first secondary air flow weakens and changes its direction in the upper secondary channel (FIG. 2D). The main air flow separates as a consequence from the wall of main channel 15 to which it adhered so far and adheres to the opposite side of the main channel 15 so that the angle with which it leaves the oscillation nozzle changes too (FIG. 2E). The described process will repeat itself iteratively and as a result (FIG. 2F), the jet leaves the nozzle outlet with changing angles having different directions. Depending on the specific geometry and the volume flow, the oscillation frequencies of the nozzle may vary. It is to be noted that the terms upper and lower are only used regarding the description of FIGS. 2A-F and shall not be understood as limiting regarding the orientation of secondary channels or secondary air flows.

Oscillation nozzles are mostly used for cooling, distribution or mixing of fluids or for cleaning purposes. The amount of the supplied volume flow is proportional to the oscillation frequency of the nozzle.

The application of an oscillation nozzle ensures the measurement of a robust periodic signal at the pressure sensor. The present invention uses the secondary air flow, which is not strong enough to deflect the fluid jet but is sufficient to change the direction of the main air flow of the oscillation nozzle. When the fluid jet interacts with the air flow of the nozzle, the secondary air flow is reduced and therefore the oscillation frequency and the amplitude of the primary air flow is changed. It is therefore possible to detect the fluid jet by the change of the oscillation frequency and amplitude with the pressure sensor. Using this method of the present invention, it will possible to measure the exact time that the fluid needs to pass the nozzle, and therefore to determine the total amount of fluid. Contamination by droplets or other substances does not lead to a negative impact on the system, as it is permanently traversed by air and cleans itself. If there is a drop in the nozzle geometry, this will be blown out by the volume flow, which constantly changes its direction.

The effect of external disturbances or the total failure of the system can be evaluated by a change in the oscillation in combination with the amplitude signal, so that a robust measurement is guaranteed.

The present invention uses a drill hole 5 in a secondary channel 10 of the oscillation nozzle 1 to influence the frequency of the system and the amplitude of the measured signal (FIG. 3 left part). Due to the fluid-gas interaction, the secondary air flow is reduced by the fluid jet 12, which causes the amplitude as well as the frequency of the signal to drop (FIG. 3 right part). This difference is then measured by a pressure sensor 20. The drill hole 5 in the secondary channel 10 also provides an asymmetry of the system, which ensures reproducible starting conditions for the oscillation.

The advantages of the invention can be summarized as follows:

f. Negligible beam deflection: Due to the low air flow in the secondary channel, the free fluid is only slightly deflected due to the low air flow. This small deflection additionally is compensated by a constant change of direction in the secondary channel (compared to FIG. 2).

g. Flexibility: Detection of gases, liquids (regardless of diameter, amount, drops, bubbles, foam) and solids is possible, regardless of the optical properties.

h. Self-Cleaning: A self-cleaning regarding small drops, dirt particles etc. is ensured by a permanent flow through the nozzle with air.

i. Periodic Signal: The Oscillation itself and the change of the oscillation frequency and the amplitude of the measured signal ensures a very robust measurement/system. Slammed doors for example will only change the amplitude but not the frequency of the signal. Additionally, the frequency of a disturbance will be different in comparison to the system frequency and can be blocked by a suitable filter. The oscillation also allows a self-test of the system, as the signal can be measured without an interruption of the air flow by the fluid jet.

It is possible to guide the fluidic free jet not through the control channel of the oscillation nozzle, but at any other point through or behind the nozzle, which changes the oscillation behavior. The positioning of the pressure sensor can be changed. For example, the oscillation of the nozzle at a laterally offset position may be determined by one or more sensors. This also applies to the angle at which the oscillating beam hits the sensor. The task of the sensor is to measure the oscillation of the air flow at the outlet 30 of the nozzle. This can be done by various methods, like a pressure sensor, a microphone or thermal measurement.

In order to improve the pressure signal, the geometry of the oscillation nozzle 1 can be further optimized. Through an adjustment of specific geometry parameters like the nozzle length, meaning the distance between in- and outlet of the nozzle, it is possible to vary frequency of the oscillation air flow, as well as by changing the angle and diameter at the outlet.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 1 oscillation nozzle
5 drill hole/detection hole
10 upper secondary channel
11 lower secondary channel
12 fluid jet
15 main channel
20 pressure sensor
30 outlet nozzle

What is claimed is:

1. An oscillation nozzle, comprising:
   a main channel;
   an inlet and an outlet defining for an air flow entering through said inlet a flow axis running centrally through the main channel; and
   two secondary channels surrounding the main channel, wherein the two secondary channels are configured to iteratively change an angle at which an air flow leaves the outlet and wherein one of the two secondary channels comprises a drill hole providing an asymmetry between the two secondary channels.

2. The nozzle according to claim 1, wherein the outlet comprises a sensor for measuring oscillation of the air flow through said outlet.

3. The nozzle according to claim 2, wherein the sensor is a pressure sensor.

4. A system comprising:
   an oscillation nozzle, comprising a main channel and two secondary channels surrounding the main channel, wherein the nozzle has an inlet and an outlet for a fluid defining a flow axis running centrally through the main channel, wherein the two secondary channels are configured to iteratively change an angle at which an air flow leaves the outlet and wherein one of the two secondary channels comprises a drill hole providing an asymmetry between the two secondary channels; and
   a sensor for sensing the oscillation frequency.

5. The system according to claim 4, wherein the sensor is arranged within the outlet of the nozzle.

6. The system according to claim 4, wherein the sensor is a pressure sensor.

7. The system according to claim 6, comprising a controller connected to the pressure sensor configured to control the pressure sensor for monitoring the oscillation frequency to a predefined intended frequency.

8. The system according to claim 4, wherein the outlet of the nozzle comprises a sensor for measuring the oscillation of the air.

* * * * *